INVENTOR
Melvin L. Doelz

INVENTOR
Melvin L. Doelz

INVENTOR
Melvin L Doelz

April 20, 1954 M. L. DOELZ 2,676,245

POLAR COMMUNICATION SYSTEM

Filed Dec. 2, 1949 6 Sheets-Sheet 4

INVENTOR
Melvin L. Doelz

April 20, 1954 M. L. DOELZ 2,676,245

POLAR COMMUNICATION SYSTEM

Filed Dec. 2, 1949 6 Sheets-Sheet 5

INVENTOR

Melvin L. Doelz

April 20, 1954 M. L. DOELZ 2,676,245

POLAR COMMUNICATION SYSTEM

Filed Dec. 2, 1949 6 Sheets-Sheet 6

INVENTOR

Melvin L. Doelz

Patented Apr. 20, 1954

2,676,245

UNITED STATES PATENT OFFICE 2,676,245

POLAR COMMUNICATION SYSTEM

Melvin L. Doelz, Los Angeles, Calif., assignor to Collins Radio Company, Cedar Rapids, Iowa, a corporation of Iowa Application December 2, 1949, Serial No. 130,810

6 Claims. (Cl. 250—8)

This invention relates in general to radiant energy data transmission systems and in particular to a polar data transmission system.

In polarity-time transmission of data by wire it has long been realized that polar transmission is superior to "on-off" transmission. In an "on-off" system the intelligence to be transmitted is encoded into pulses and spaces (lack of pulses). Because of ever present noise, the spaces are not always discernible and consequently errors occur in the transmission of the intelligence. In a polar system a pulse is sent during each time interval and the intelligence is encoded into the pulses by reversing the polarity of some of them. The magnitude of the pulses remains constant and it is only the polarity which changes. The chance of error in the polar transmission system is much less than the "on-off" system because nearly always the transmitted pulse is discernible through noise. The problem of establishing a polarity reference in a wired system is relatively simple, however, in a polar radiant energy system many difficulties are encountered.

It is an object of the present invention, therefore, to provide a polar transmission system wherein a change in the polarity of the signal corresponds to a "mark" in the data, and no change in polarity of the signal corresponds to a "space" in the data.

A further object of this invention is to provide a radiant energy polar transmission system which requires only a narrow band width.

Yet another object of this invention is to provide a polar transmission system which can be cheaply and quickly constructed.

Further objects and advantages will appear in the specification and drawings, in which.

Figure 9:
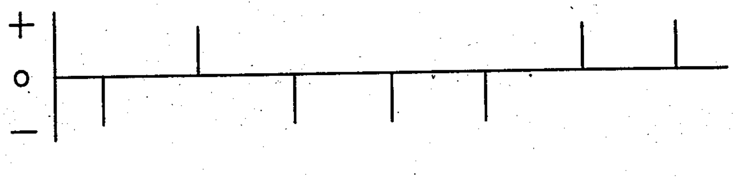
Figure 10:
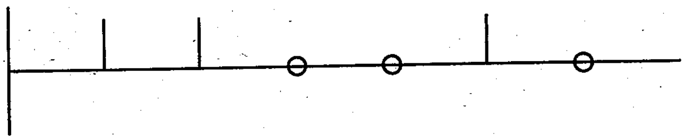

Fig. 9 illustrates the output of phase detector 48 when the phase of the local oscillator is reversed 180 degrees; and Fig. 10 illustrates the output of the full wave rectifier 72.

Figure 1:
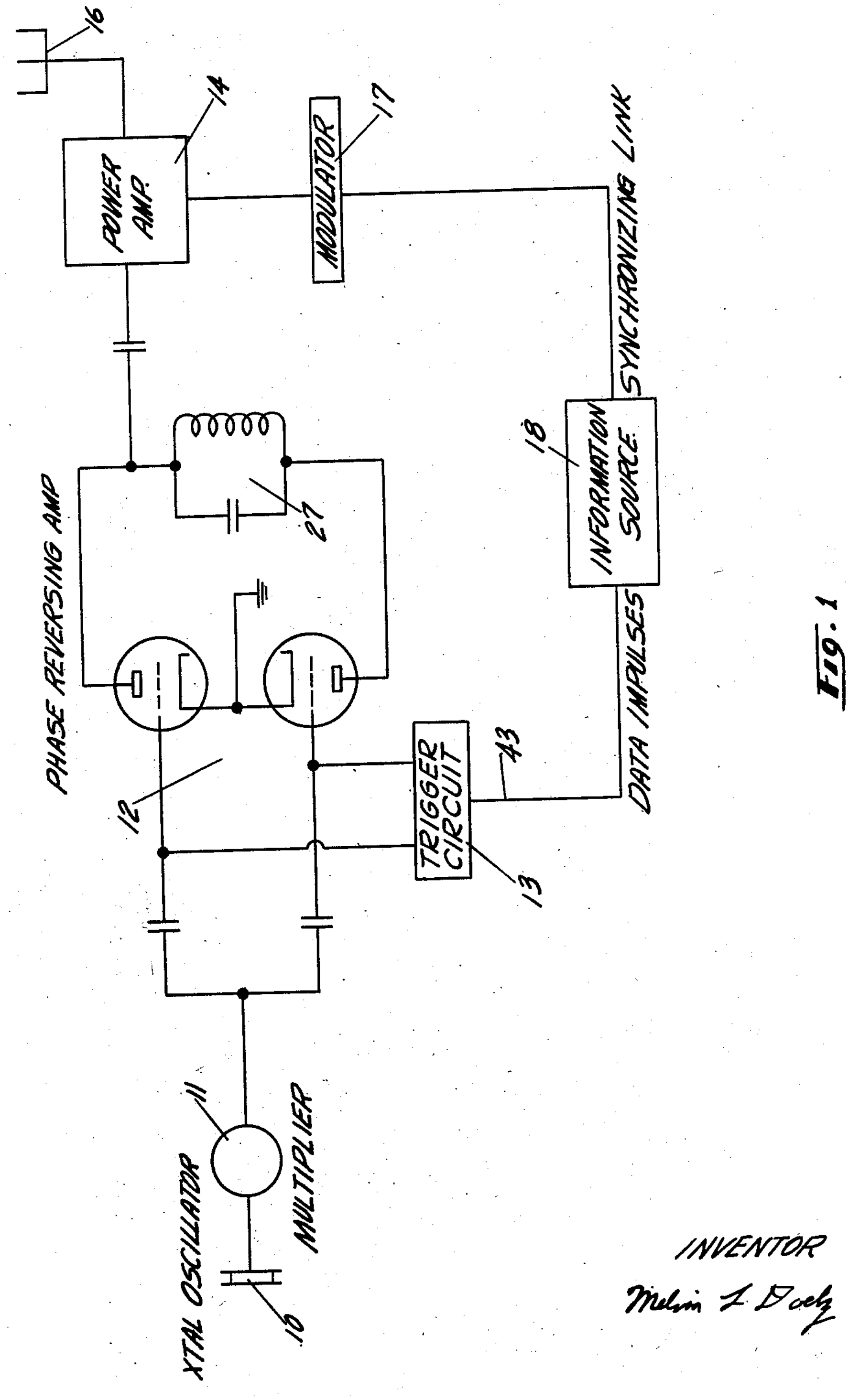
Fig. 1 is a schematic diagram of the polar transmitter of this invention.

With reference to the drawings, Fig. 1 illustrates a transmitter which has a crystal oscillator 10 which feeds a multiplier 11 to obtain a radio frequency carrier wave. A phase reversing network 12 receives the radio frequency carrier from the multiplier 11 and reverses the phase of the carrier by 180 degrees in response to data impulses furnished to a controlling trigger circuit 13. A power amplifier 14 receives the output of the phase reversing network 12 and amplifies it before supplying a radiating antenna 16 with the carrier.

The modulator 17 produces a modulating signal with a frequency equal to the frequency of transmission of pulses. The modulating signal modulates the carrier wave in the power amplifier 14. The modulation is 100 per cent so that the carrier wave goes to zero each cycle of the modulating wave.

The modulation is in synchronism with the data pulses furnished by the information source 18. Thus, the trigger circuit 13 causes the phase reversing network to reverse the phase of the radio frequency carrier at a time when the modulator 17 has modulated the carrier to zero. Thus if there is a phase reversal no extreme transient effect will occur. For a more detailed explanation of the manner in which the modulator 17 may be synchronized with the data pulses from the information source 18 reference may be made to page 497, Proceedings of I. R. E., volume 37 (May 1949).

Figure 2:
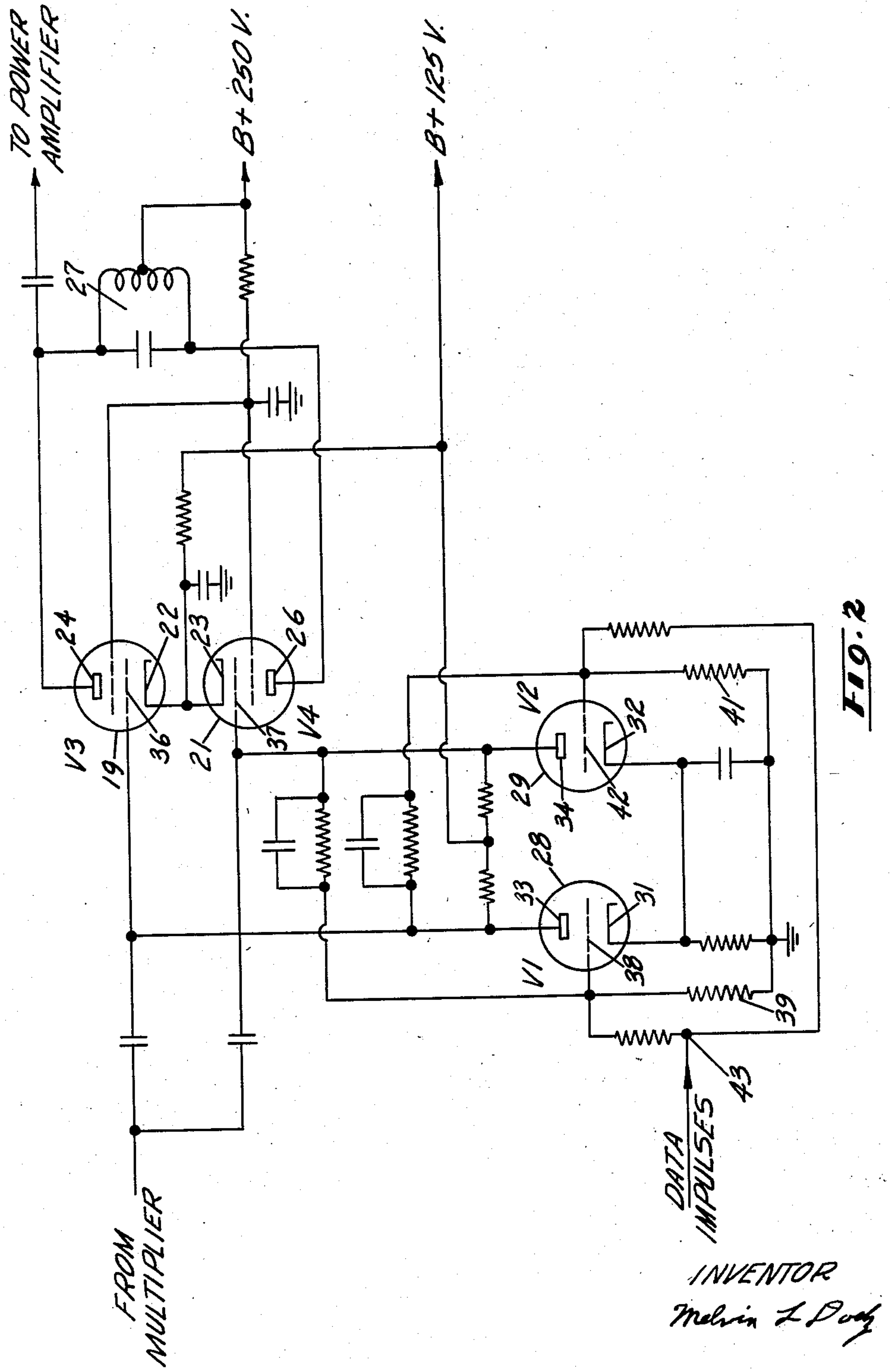
Fig. 2 is a detailed wiring diagram of the phase reversing circuit of the transmitter shown in Fig. 1.

Referring to Fig. 2, the phase reversing network 12 and trigger circuit 13 are shown in more detail. A pair of vacuum tube amplifiers 19 and 21 are driven in phase by the radio frequency signal from the multiplier 11. The cathodes 22 and 23 are connected together and the plates 24 and 26 are connected to opposite ends of a tank circuit 27. Thus, if provision is made for only one of the tubes 19 or 21 to conduct at a time, the output across the tank 27 will reverse phase by 180 degrees when conduction changes from one tube to the other.

The trigger circuit 13 comprises the two tubes 28 and 29 connected with their cathodes 31 and 32 together and may be of the well-known Eccles-Jordan type. The plates 33 and 34 of the tubes 28 and 29 are connected to the grids 36 and 37 of the phase reversing network 12. Thus when plate current flows in tube 28, tube 29 is biased past cut-off and current will flow in tube 19. When tube 29 of the trigger circuit is conducting, tube 28 is biased past cut-off and, consequently, current will flow in tube 21.

The Eccles-Jordan circuit has only two stable conditions, to wit:

1. Plate current flowing in tube 28 and no plate current in tube 29; and

2. Plate current flowing in tube 29 and no plate current in tube 28.

The grid 38 of tube 28 is connected in series with resistors 39 and 41 to grid 42. A triggering signal is furnished to the grid circuit from the information source 18 at the point 43 and when the triggering signal is sufficiently negative the trigger circuit will go from one stable condition to the other.

The information source supplies negative pulses to the trigger circuit 13. The information source may be, for example, a teletype machine capable of coding written intelligence into an "on-off" code. That is, "on" indicates a "mark" and "off" indicates a "space." Now if all marks are negative pulses, it will be seen that the trigger circuit 13 will go from one stable condition to the other when a mark is sent by the information source. Likewise, the trigger circuit will remain in the prior stable condition when a space is sent. Stated otherwise, the presence of a negative pulse indicates a mark and the absence of an impulse indicates a "space." Five signals will give a total of 32 combinations and, therefore, 26 of these 32 combinations may be used as the English alphabet.

Since the trigger circuit 13 controls the phase reversing network 12, a 180 degree phase reversal occurs in the radio frequency carrier across tank circuit 27 whenever a negative pulse occurs at point 43. Thus the mark-space information has been converted into a series of phase reversals of transmitted pulses. The correspondence is between "mark" and a reversal of the radio frequency carrier, and "space" and a lack of reversal, as opposed to the conventional polar system in which a "mark" is represented by one phase and a "space" by the opposite phase. This requires the transmission of one more output pulse than the number of marks and spaces since the first pulse acts as a reference for determining whether or not a reversal has occurred between it and the second pulse. The second pulse serves as a reference for phase comparison with the third pulse, and so on, ad infinitum, or until the termination of transmission. It is to be noted, however, that no absolute reference is required at the receiving station since each pulse in effect serves as a reference for the following pulse and only reversals need be known for interpretation of the received signal.

Figure 3:
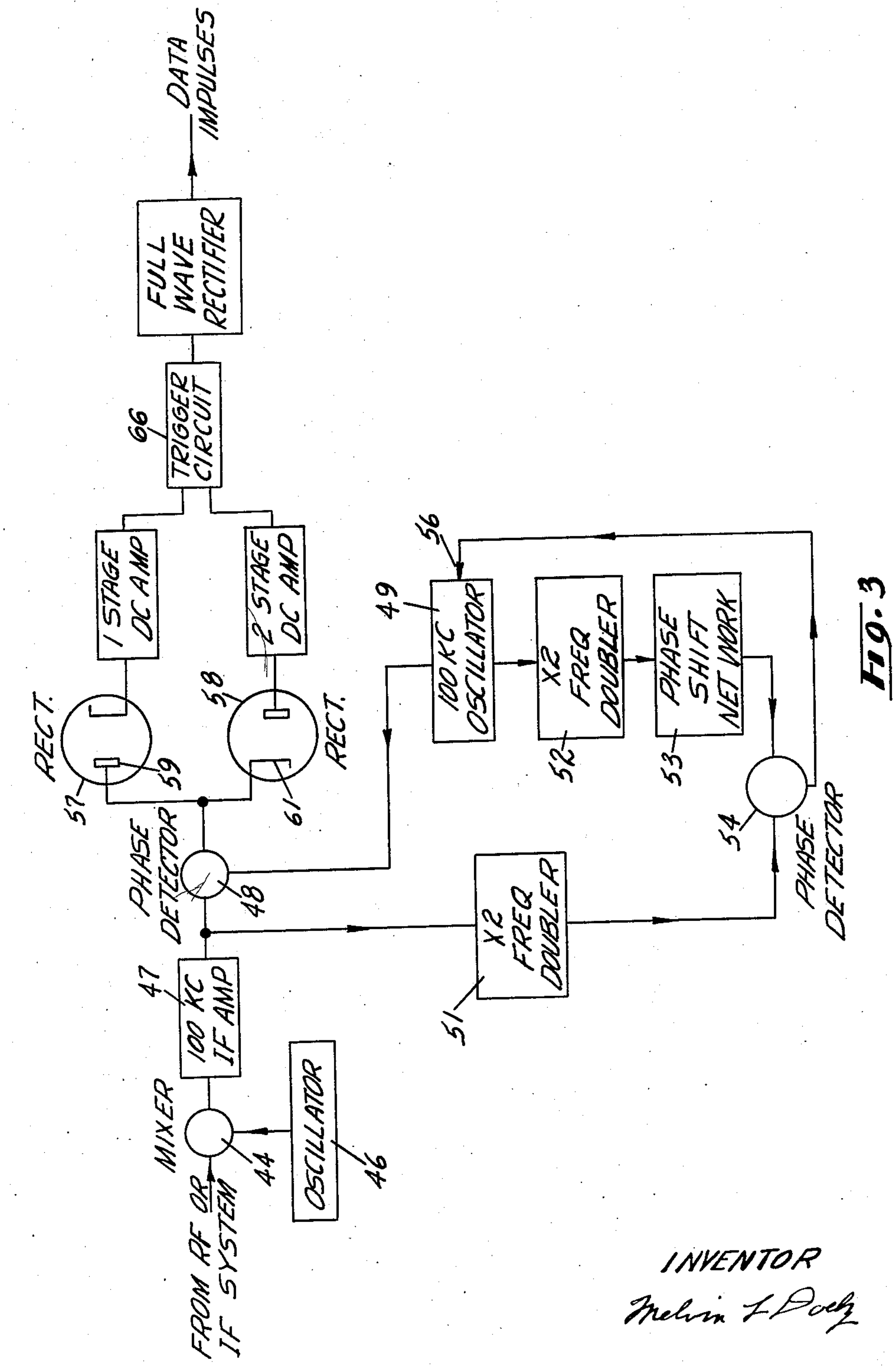
Fig. 3 is a schematic diagram of the receiver of this invention.

The receiver of this system is shown in Fig. 3. The incoming signal is received by an antenna, not shown, and furnished to a mixer 44 which also receives a signal from a mixing oscillator 46. An intermediate frequency amplifier 47 receives the output of mixer 44 and passes it to a phase detector 48. A local oscillator 49 oscillates at substantially the center frequency of the intermediate frequency output of the amplifier 47 and for illustrative purposes, 100 kc. has been used as a possible frequency. A frequency doubler 51 receives a portion of the amplifier 47 output. An output from oscillator 49 is furnished to a second frequency doubler 52, which in turn feeds a ninety degree phase shift network 53. A second phase detector 54 receives a signal from frequency doubler 51 and phase-shift network 53. A phase detector gives an output proportional to the projection of the phase vector of one input voltage on the phase vector of the other input voltage. Thus if the output of phase detector 54 is fed to a control device in oscillator 49 in such a manner that the oscillator obtains a phase lock, the output of oscillator 49 will be at the same frequency as the signal from amplifier 47. Since the output from the 100 kc. I. F. amplifier 47 is multiplied by two before being fed to phase detector 54, a signal appearing at 54 is identical for either polarity of the signal from the I. F. amplifier 47 and, if the oscillator 49 is in phase with either of the two types of incoming waves, zero output will be obtained from the phase detector 54. The output of phase detector 54 is fed to the frequency controlling element 56 causing the frequency of the oscillator to be shifted through a range of values including the desired frequency where a phase lock will be obtained.

The envelope of the transmitted pulses will thus be reproduced at the output of phase detector 48. The polarity of the output pulses will be positive when the signal from oscillator 49 is in phase with the incoming signal and the polarity will be negative when the signals are out of phase.

A pair of diode rectifiers 57 and 58 receive the output from phase detector 48. The plate 59 of tube 57 and the cathode 61 of tube 58 are connected together and thus, tube 51 passes the positive pulses and tube 58 passes the negative pulses.

Figure 4:
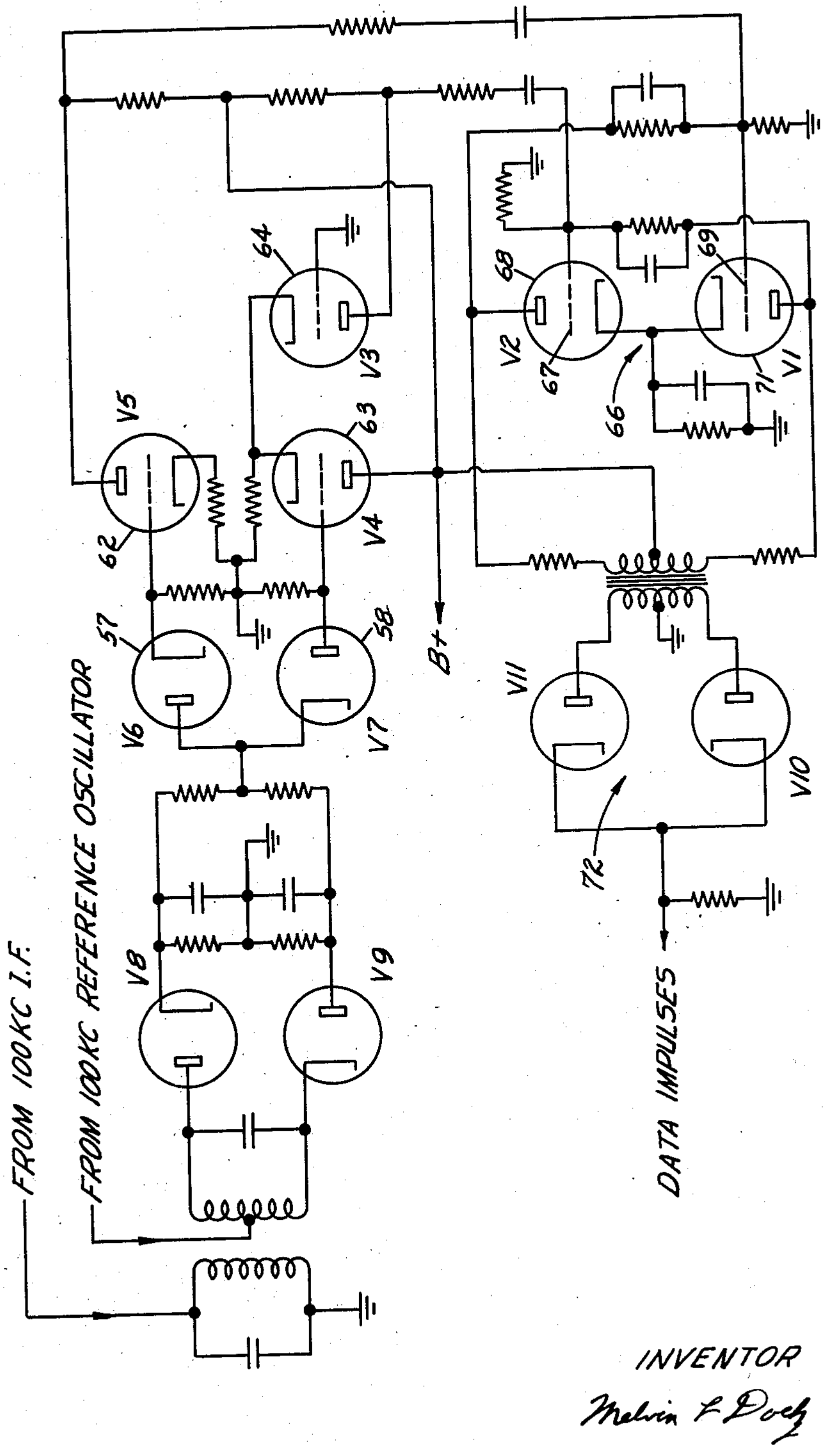
Fig. 4 is a detailed wiring diagram of the phase detecting and reversing circuits of the receiver shown in Fig. 3.

As best shown in Fig. 4, a D.-C. amplifier 62 receives the positive pulses from tube 57 and amplifies them and inverts them to negative pulses. A pair of D.-C. amplifiers 63 and 64 receive the negative pulses from tube 58 and amplify them. It is to be noted that the polarity of the output of amplifier 64 is negative because tube 63 changed the negative pulses to positive ones and tube 64 changed them back to negative. The gain of amplifier 62 is of the same order as the total gain through amplifiers 63 and 64.

A trigger circuit 66 is controlled by the outputs from amplifiers 62 and 64 with control grid 67 of tube 68 receiving the output of amplifier 64 and the control grid 69 of tube 71 receiving the output of amplifier 62. When either of the control grids 67 or 69 receive a negative pulse they bias the tubes 68 and 71, respectively, past cut off. Thus, if tube 68 is conducting and a negative pulse is received on grid 67, it is biased to cut off and conduction changes to tube 71. If a second negative pulse is received on grid 67, tube 68 is further biased past cut-off and no change in conduction occurs. When, however, grid 69 receives a negative pulse, tube 71 will be biased to cut-off and conduction will change to tube 68. Thus, it is seen, that the changes in polarity of the transmitted signal trigger the flip-flop circuit.

A full-wave rectifier 72 is coupled to the output of the trigger circuit 66 and gives a positive pulse every time conduction changes in the trigger circuit. Thus the data delivered to the transmitter trigger circuit 13 is reproduced by the full wave rectifier 72. The data is then decoded by a second teletype machine into the transmitted message.

Figure 5:
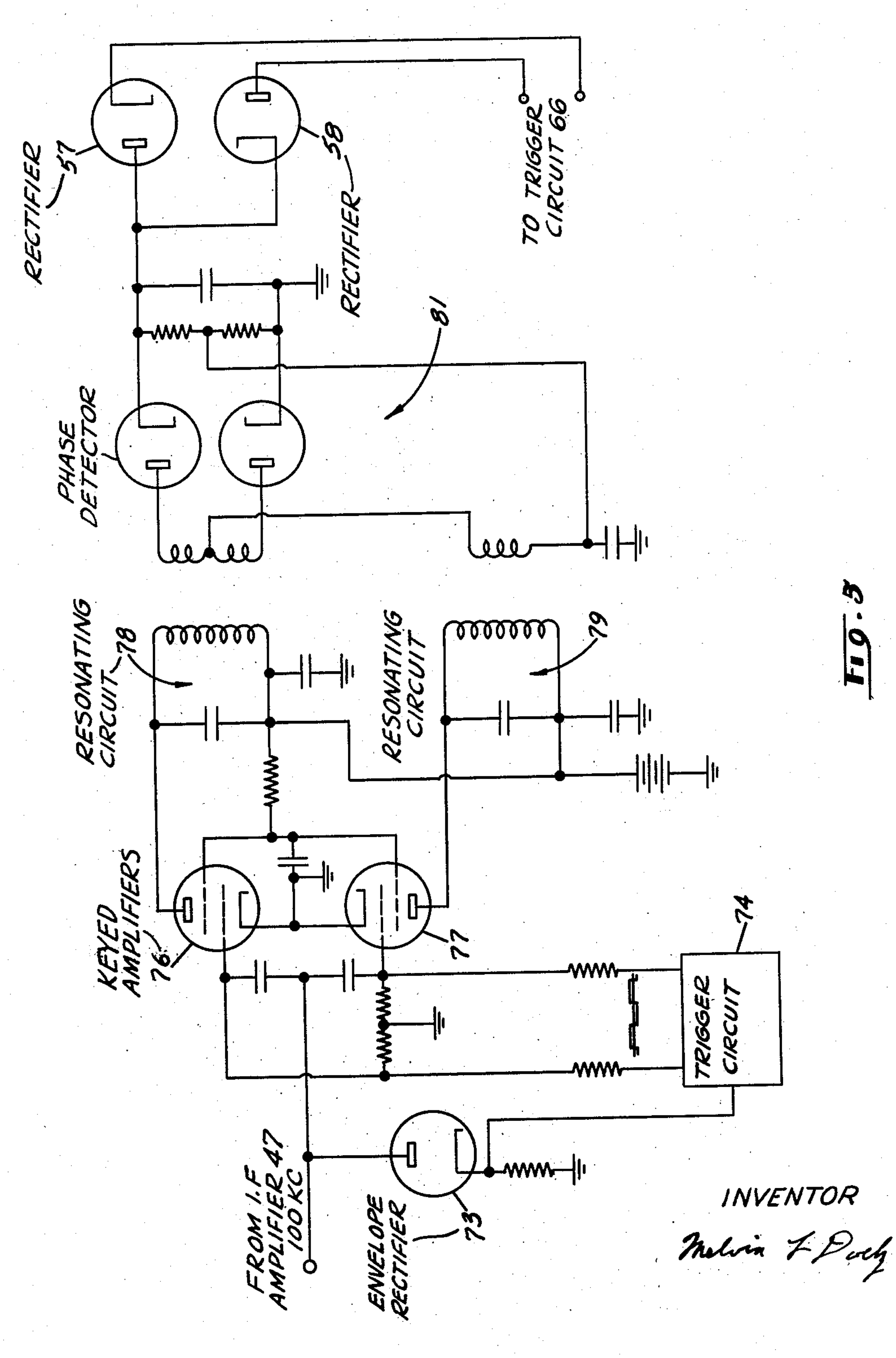
Fig. 5 is a wiring diagram of a modification of receiver shown in Fig. 3.

An alternative embodiment of the principles of this invention for the reception of a transmission such as is emitted by the transmitter of Fig. 1. is shown in Fig. 5. Here the 100 kc. intermediate frequency wave is rectified by envelope rectifier 73 which produces a positive pulse on receipt of an intermediate frequency pulse of either phase. These pulses are applied to a flip-flop circuit 74 which produces a push-pull square-wave voltage in synchronism with the received pulses. This square wave voltage is applied as blocking voltage to a pair of keyed amplifiers 76 and 77 so that one amplifier is blocked off during the reception of one pulse and the other is blocked off during the reception of the next pulse. Both keyed amplifiers receive the 100 kc. intermediate frequency signal and the plate circuit of each is connected to a resonating circuit 78 and 79 of low decrement. Hence, there remains in the resonator of the tube which is blocked off during the reception of a pulse an appreciable oscillation which was induced in this resonator during the reception of the previous pulse. The phase of this remnant oscillation is compared with that of the oscillation from the current pulse in the other resonator by phase detecting rectifier 81 so that the output of this rectifier is positive whenever two successive pulses are received in like phase and negative whenever successive pulses are received in unlike phase. The output of this phase detector is then treated just like the output of the phase detector 48 in Fig. 3.

Figure 6:
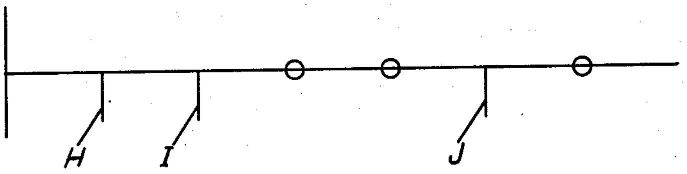
Fig. 6 is an example of "mark-space" information which it is desired to transmit by the system of this information.
Figure 7:
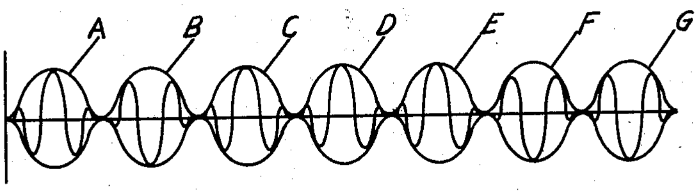
Fig. 7 illustrates the transmitted wave shape for the information illustrated in Fig. 5.

In operation, the message to be transmitted is furnished to the encoding information source 18 which changes it into "mark-space" intelligence. Fig. 6 gives an example of the form of the information to be furnished to the trigger circuit 13. As shown in Fig. 7 each mark causes the modulated carrier wave to reverse phase by 180 degrees. Thus, between pulse A and B a reversal occurred because of the mark H furnished to trigger circuit 13. A phase reversal occurred between pulses B and C because of the "mark" I. No change occurred between pulse C and D because there was no "mark."

The wave radiated from antenna 16 will be of the form shown in Fig. 7.

The phase detector 48 will compare the incoming signal with the local oscillator 49 output and will give an output of positive and negative pulses which have the shape of the envelope of the modulation on the carrier. For illustrative purposes, the phase detector output has been shown in the form of peaked pulses. The polarity of the pulse is the important controlling factor and not the wave shape.

Figure 8:
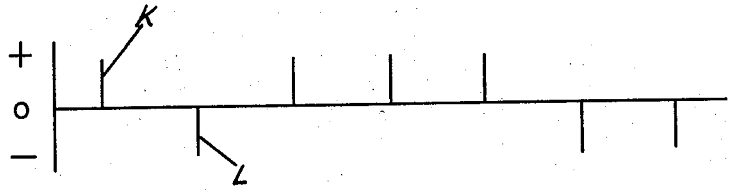
Fig. 8 illustrates the output of phase detector 48.

Figure 8 illustrates the phase detector 48 output when the oscillator 49 output is in phase with pulse A of the incoming signal. Pulse K will be positive, pulse L negative because of the phase reversal between pulse A and B of the incoming signal and so on.

If on the other hand, the local oscillator 49 locks in phase with the incoming signal so that pulse A is 180 degrees out of phase with the oscillator output, a negative pulse will be obtained and the output will look like Fig. 9. It is to be noted that the only difference between the pulses of Fig. 8 and the pulses of Fig. 9 is that the polarity of each one is reversed.

The output of full-wave rectifier 72 is shown in Fig. 9 and is the same for the conditions shown in either Fig. 7 or Fig. 8. This is true because the full wave rectifier gives a positive output each time a change in signal is applied to phase detector 48.

The output of the full-wave rectifier is decoded in a teleprinter or other well known decoder and the original message has been transmitted.

Although this invention has been described with respect to preferred embodiments thereof, it is not to be so limited as changes and modifications may be made therein which are within the full intended scope as defined by the appended claims.

I claim:

1. In a polar transmission system, a receiver comprising, a local oscillator having an output of the same frequency as a received signal and with the phase vector representing the local oscillator output being substantially parallel to the phase vector representing the received signal, a phase detector receiving the received signal and the output of said local oscillator to compare them and give a positive signal when they are in phase and a negative signal when they are out of phase, a pair of rectifiers receiving the output of said phase detector, and one of the rectifiers passing the positive signals and the other rectifier passing the negative signals, a direct-current amplifier receiving the positive output of the one rectifier to invert it to a second negative signal, a trigger circuit with its grids controlled by the first and second negative signals, and a full wave rectifier coupled to said trigger circuit and giving data output.

2. In a polar transmission system, according to claim 1, a phase and frequency stabilizer for said local oscillator comprising, a first frequency doubler receiving an incoming signal, a second frequency doubler receiving an output from the local oscillator, a 90 degree phase-shift network receiving the output of said second frequency doubler, a second phase detector receiving an output from the first frequency doubler and an output from the phase shifting network, the output of said second phase detector fed to phase and frequency control means on said local oscillator for maintaining the frequency of the signals received by said second phase detector in synchronism.

3. In a polar communication system wherein the radio frequency phase of a transmitted pulse is reversed with respect to that of the previous pulse in the presence of a signaling pulse, a receiver comprising, an envelope rectifier receiving the incoming signal, a trigger circuit triggered by the output from said envelope rectifier, a pair of keyed amplifiers receiving an output from said antenna, said trigger circuit controlling said amplifiers so that conduction changes from one to the other at each pulse of the received wave, a first tank circuit of low decrement connected to the output of one of the keyed amplifiers, a second tank circuit of low decrement connected to the output of the other keyed amplifier, phase detecting means coupled to the first and second tank circuits to compare their phase and give a positive output when successive pulses are in phase and a negative output when they are 180° out of phase, a pair of rectifiers receiving the output from said phase detector and one rectifier passing the positive output and the second rectifier passing the negative output, a direct current amplifier receiving the positive output of the one rectifier to invert it to a negative output, a trigger circuit with its grid controlled by the output from said direct current amplifier and said second rectifier, respectively, and a full-wave rectifier coupled to said trigger circuit to give output data pulses.

4. A radiant energy receiving means comprising, a reference oscillator producing a signal of the same frequency as a received signal, a phase detector comparing the phase of the received signal with the phase of the output of said reference oscillator to give a positive output when the signals are in phase and a negative signal when they are out of phase, a direct current amplifier receiving said positive output and inverting it to obtain a negative signal, a trigger circuit receiving inputs from said direct current amplifier and said phase detector, and full wave rectifying means connected to said trigger circuit to reproduce data.

5. A receiving means comprising, an envelope rectifier receiver receiving an incoming signal, a first trigger circuit producing a square wave in response to an input received from said envelope rectifier, a pair of keyed amplifiers connected to said trigger circuit and alternately keyed on and off, the incoming signal supplied to said keyed amplifiers, a first resonant circuit of low decrement connected to the first keyed amplifier, a second resonant circuit of low decrement connected to the second keyed amplifier, a phase detector coupled to the first and second tuned circuits, a pair of polarity sensitive half-wave rectifiers connected to the output of said phase detector, and a second trigger circuit connected to said half-wave rectifiers.

6. A receiving system comprising, a phase detector, a local oscillator supplying an input to said phase detector, an incoming signal supplied to said phase detector, a pair of rectifiers connected to said phase detector to pass outputs of opposite polarity, a trigger circuit connected to said rectifiers, and a full wave rectifier connected to the output of said trigger circuit.

References Cited in the file of this patent

UNITED STATES PATENTS

| Number | Name | Date |
|---|---|---|
| 1,559,642 | Nyquist | Nov. 3, 1925 |
| 2,922,282 | Bellescize | Aug. 15, 1933 |
| 2,113,214 | Luck | Apr. 5, 1938 |
| 2,491,810 | Guanella | Dec. 20, 1949 |
| 2,509,066 | Koch | May 23, 1950 |